(12) United States Patent
Nakagawa

(10) Patent No.: US 6,615,697 B2
(45) Date of Patent: Sep. 9, 2003

(54) MACHINE TOOL

(75) Inventor: Atsushi Nakagawa, Niwa-gun (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/967,968

(22) Filed: Oct. 2, 2001

(65) Prior Publication Data

US 2002/0059851 A1 May 23, 2002

(30) Foreign Application Priority Data

Nov. 2, 2000 (JP) .......................... 2000-336396

(51) Int. Cl.7 .......................... B23B 7/00; B23B 25/06; B23C 9/00
(52) U.S. Cl. .......................... 82/118; 82/133; 409/147
(58) Field of Search .......................... 409/147, 148, 409/149, 186, 187, 188, 193, 195; 408/12, 13; 82/132, 133, 118, 120, 121, 129, 134; 33/702, 706, 707, 708, 1 PT, 832, 833, 838

(56) References Cited

U.S. PATENT DOCUMENTS

| | | | | |
|---|---|---|---|---|
| 3,571,834 A | * | 3/1971 | Mathias | 408/9 |
| 3,600,987 A | * | 8/1971 | Kvasnicka | 82/11.3 |
| 4,014,227 A | * | 3/1977 | Adams | 335/231 |
| 4,354,404 A | * | 10/1982 | Ramusino | 82/122 |
| 4,451,892 A | * | 5/1984 | McMurtry | 700/192 |
| 4,608,747 A | * | 9/1986 | Link et al. | 483/14 |
| 4,664,566 A | * | 5/1987 | Peddinghaus | 408/13 |
| 4,784,541 A | * | 11/1988 | Umehara et al. | 409/186 |
| 6,038,489 A | * | 3/2000 | Pickles et al. | 700/164 |
| 2002/0066201 A1 | * | 6/2002 | Boge et al. | 33/706 |

* cited by examiner

Primary Examiner—A. L. Wellington
Assistant Examiner—Brian D Walsh
(74) Attorney, Agent, or Firm—Armstrong, Westerman & Hattori LLP

(57) ABSTRACT

It is an object of the present invention to provide a machine tool that the process accuracy does not deteriorate even if the accuracy of the machine itself changes to some extent. A work support means 3 of a spindle 8 etc. to support a work (W), a cutting means 4 of a movable feed bar 9 to the work support means 3 to process the work (W) and a tool base 10 and the like and a control unit 2 are provided. The control unit 2 controls the movement of the cutting means 4 by the measured positional information based on a process origin ($O_w$) of the work support means 3. The position measurement means 25 like a linear sensor is provided as the means to measure the position to the moving direction of the cutting means 4 based on the process origin ($O_w$).

4 Claims, 5 Drawing Sheets

MACHINE TOOL

FIELD OF THE INVENTION

The present invention relates to a machine tool like a lathe and a grinding machine and so on.

BACKGROUND OF THE INVENTION

In general, with regard to a machine tool like a lathe as shown in FIG. 7, in case that the feed control of a tool base 51 is carried out by a control unit 50 like NC units, the semi-closed loop control using the feedback signal F/B which is obtained from an encoder 53 of a servomotor 52 is adopted. The drive of the servomotor 52 is transmitted to the tool base 51 through a ball screw 56.

It is usually the case that a mechanical origin ($O_m$) in the control unit 50 is set to position the location where the tool base 51 is the most far from a headstock 54. FIG. 8 shows the mechanical origin ($O_m$) that is the origin in the coordinate of the feedback signal F/B by the encoder 53.

However, the thermal expansion is generated in the ball screw 56 as the cutting heat by the process and the other part heat by the machine operation is generated. Therefore, the semi-closed loop control has a substantial margin of error. In other words, a process origin ($O_w$) as shown in FIG. 8 is the center of a work (W) which is gripped by a spindle 55 (FIG. 7) and is positioned far from the mechanical origin ($O_m$) that is the origin of the feedback signal F/B, so that the substantial margin of error comes out even if the feedback control is carried out, if there are the thermal expansion of the ball screw 56 and the mechanical deformation. The high accuracy amendment is difficult though the thermal expansion is amended, so that there is a limit to improve the process accuracy.

In order to improve the process accuracy, the closed loop control is also adopted by providing a linear sensor 57 as shown in the dash-dot line in FIG. 7. The linear sensor 57 is attached along the slide surface of the machine, for example a guide of the tool base (not shown in the drawings) in a bed 58. According to this, the position of the tool base 51 can be detected directly without acting on the thermal expansion of the ball screw 56.

However, as shown in the same drawings with emphasizing the displacement, in case of the disturbance like the minute lean in the headstock 54, the error becomes big even by the closed loop control in the same drawings. The above-mentioned disturbance is difficult to be amended by the control as it happens by the cutting heat, the load condition and the surroundings and the like, and the displacement is not fixed.

It is an object of the present invention to provide a machine tool that the process accuracy does not deteriorate even if the accuracy of the machine itself changes to some extent.

It is another object of the present invention that the high accuracy process mentioned above is carried out in a simple structure.

DETAILED DESCRIPTION OF THE PREFERRED EMBODIMENTS

Figure 1:
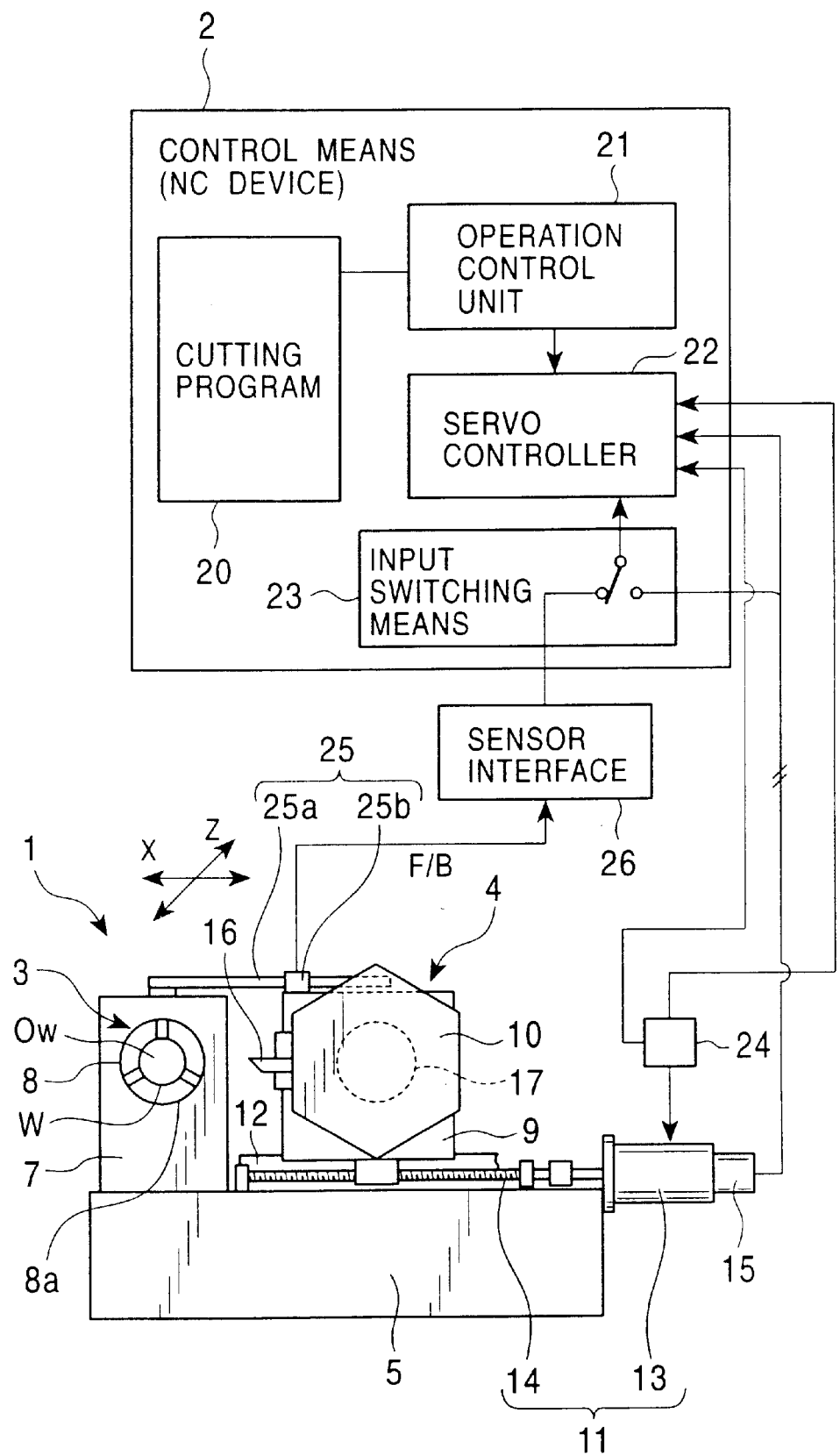
FIG. 1 is a block diagram, showing the general structure of the machine tool in an embodiment of the present invention.

The structure of the present invention will be described with FIG. 1 corresponding to the embodiment.

This machine tool is equipped with a support work means 3 which supports the work (W), a cutting means 4 which is movable to the work support means 3 in order to process the work (W) and a control unit 2 that the movement of the aforementioned cutting means 4 is controlled by the positional information based on a process origin ($O_w$) that is the prescribed position of the work (W) supported by the work support means 3.

According to this structure, the control unit 2 controls the movement of the cutting means 4 by the positional information based on the process origin ($O_w$) that is the prescribed position of the work support means 3. The prescribed position of the work support means 3 is the center of a spindle 8 etc. which composes the work support means 3, for example. The above-mentioned positional information is the measured positional information for instance, and the information is used in a feedback control and so on in the control unit 2. As controlled by the positional information based on the process origin ($O_w$) like this, even if some displacement is generated to the machine itself by the heat displacement or the disturbance, the error which the positional information affects the process accuracy is only the machine displacement of a machine part 1 corresponded to the process measurement from the process origin ($O_w$) to the work (W). Therefore, the process accuracy does not deteriorate even if the accuracy of the machine itself changes to some extent.

In the present invention, a location measurement means 25 which measures the position of the moving direction of the aforementioned cutting means 4 based on the aforementioned process origin ($O_w$) is provided, and the aforementioned positional information can be obtained from the location measurement means 25. A linear sensor or a laser-measuring machine can be used as the above-mentioned position measurement means 25.

By using the position measurement means 25 based on the process origin ($O_w$) like this, the control by the positional information based on the process origin ($O_w$) by the above-mentioned control unit 2 can be carried out easily.

The aforementioned location measurement means 25 may measure only the moving range that the aforementioned cutting means 4 processes.

In case of the position control based on the process origin ($O_w$), the range that the measured positional information affects the process accuracy is only the moving range that the cutting means 4 processes, so that the process accuracy can be improved if the position measurement means 25 can measure this moving range. Though the high accuracy position measurement means is expensive, the cost can be reduced by shortening the means, only the length of the moving range that processes like this. According to the moving range which goes off the moving range to process, for example, the lower-accuracy measurement means can be used compared with the one for using the moving range to process, and the semi-closed loop control by encoders and the like which is attached on a servo motor 13 can be also used.

DETAILED DESCRIPTION OF THE INVENTION

The further detailed explanation of the present invention will be described with the drawings.

This machine tool, comprising a numerical control type lathe, is equipped with the machine part 1 and the control unit 2 which controls the machine part 1. The machine part 1 has the work support means 3 which supports the work (W) and the cutting means 4 which is movable to the work support means 3 in order to cut the work (W). The control unit 2 has the function to control the movement of the cutting means 4 by the measured positional information base on the process origin ($O_w$) that is the prescribed position of the work support means 3.

The work support means 3 comprises the spindle 8 supported by a headstock 7 on a bed 5 and a spindle chuck 8a installed on the spindle 8. The spindle 8 is driven by a spindle motor (not shown in the drawings) which is installed in the bed 5.

Figure 2:
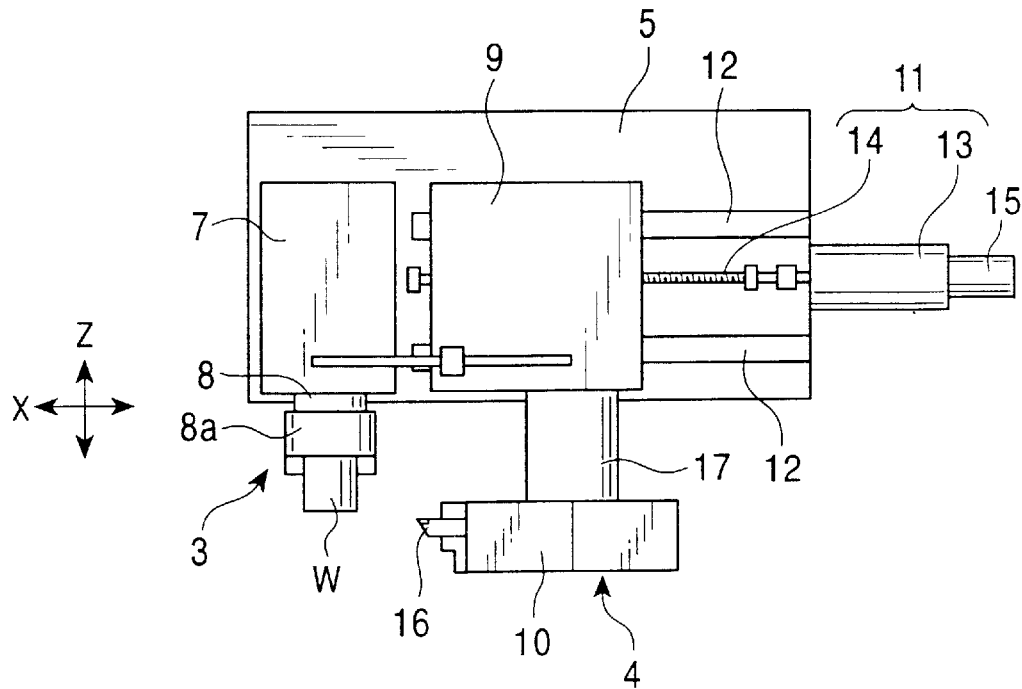
FIG. 2 is a top view of the machine part of the same machine tool.

The cutting means 4 comprises a feed bar 9 installed on the bed 5, a tool base 10 installed in the feed bar 9 and a movable drive means 11 of the feed bar 9. The feed bar 9 is installed on a guide 12 (see FIG. 2) provided in the bed 5 such as to move to the orthogonal direction (X-axis direction) to the axis direction (Z-axis direction) of the spindle 8. The movable drive means 11 moves the feed bar 9 through a ball screw mechanism 14 by the rotation of a servomotor 13. The servomotor 13 has a rotary detector 15 like a pulse coder or a pulse generator. The tool base 10 comprises a turret, and a bite or a tool 16 like a rotating tool is installed on a plurality part of the contour. The turret tool base 10 is installed to be freely access to the Z-axis direction orthogonal to the moving direction (X-axis direction) to the feed bar 9 through a turret axis 17, and is installed to rotate freely. The feed bar 9 is loaded on a freely access drive means and an indexing rotary means of the tool base 10 (not shown in the drawings). Moreover, the cutting means 4 is not confined to the turret type, and the tool 16 may be installed in the feed bar 9, omitting the tool base 10. In other words, the feed bar 9 can be the tool base.

Figure 4:
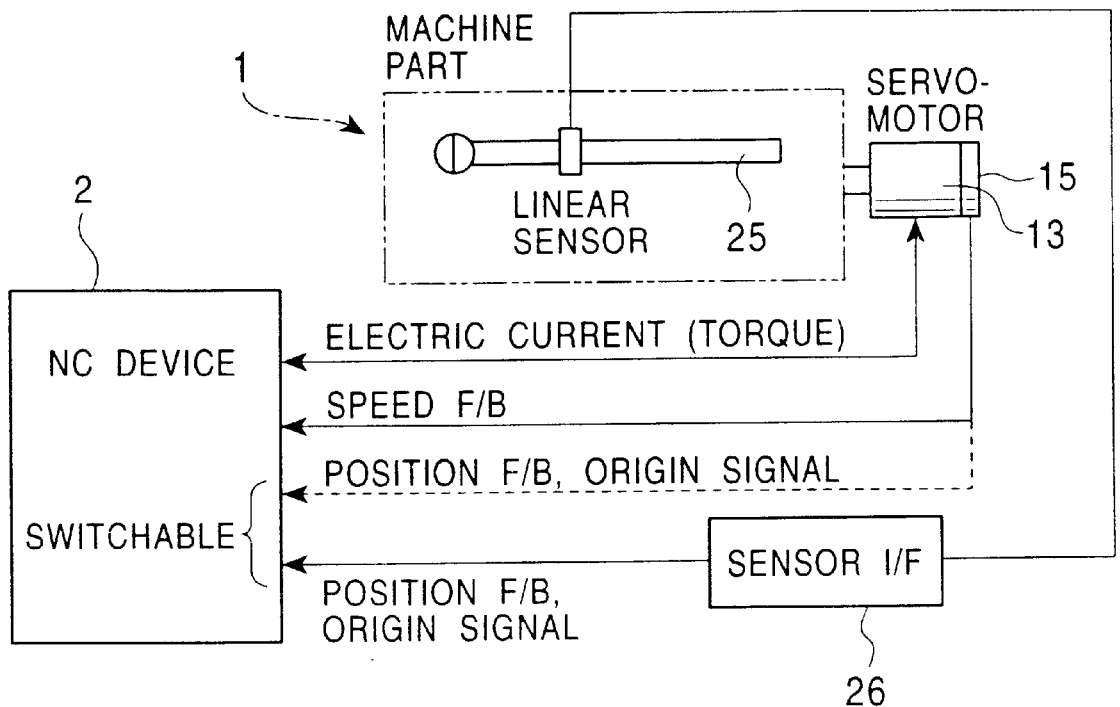
FIG. 4 is an illustrative diagram of the feedback signal in the same machine tool.

The control unit 2, comprising a numerical control unit, is the means to control the each part of the machine part 1, decoding a cutting program 20 by an operation control unit 21. The control unit 2 has the function of a programmable controller. The operation control unit 21 has the function to output a drive command to a servo controller 22 according to the movement command to the X-axis direction of the cutting program 20. The servo controller 22 feedback-controls the servomotor 13 according to the above-mentioned drive command. Only the position feedback, or the only position and the velocity feedback may be used in the feedback control by the servo controller 22, but the position, the velocity and the electric current feedback are carried out in this example (refer to FIG. 4). The velocity feedback is carried out by using the speed detection signal of the rotary detector 15 which is made by the pulse generator installed on the servomotor 13. The electric current feedback is carried out by using the electric current value by an ammeter 24 provided with the power circuit of the servomotor 13.

The position feedback by the servo controller 22 is carried out by switching a control by the position detection signal of the rotary detector 15 provided on the servomotor 13 and a position detection signal of the position measurement means 25 which the position of the feed bar 9 is detected directly. The position measurement means 25, comprising a linear sensor, has a scale part 25a and a reading unit 25b which reads the scale part 25a. The scale part 25a is installed on the work support means 3. To be more precise, the scale part 25a is installed on the headstock 7. The reading part 25b is installed on the cutting means 4. For example, the reading unit 25b is installed on the feed bar 9. The reading part 25 outputs through a sensor interface 26. Moreover, conversely, the scale 25a may be provided on the feed bar 9, and the reading part 25b may be installed on the headstock 7.

The measurement origin position of the position measurement means 25 comprising a linear sensor is adjusted to the center of the cutting means 4, or the process origin ($O_w$) that the spindle 8 rotates, to the X-axis direction that is the measurement direction. In case that the scale part 25a is provided on the headstock 7 as shown in the drawings, the origin of the scale part 25a is adjusted to the process origin ($O_w$).

The position measurement means 25 can only measure the moving range that the cutting means 4 processes. To be more precise, the moving range means the range from the process origin ($O_w$) to the radius dimension of the maximum-diameter work (W) which the spindle 8 can support, or includes the slightly buffer distance to this range.

The control unit 2 has an input switching means 23, and the input switching means 23 delivers the output to the servo controller 22 by switching the output of the position measurement means 25 and the position detecting output of the rotary detector 15 of the servomotor 13 automatically. For example, this automatic switching delivers the output of the position measurement means 25 till the output of the position measurement means 25 is reached to the prescribed position, the maximum position for instance, and the position detecting output of the rotary detector 15 is delivered in case that the output exceeds the above-mentioned prescribed position.

The control unit 2 controls the movement of the cutting means 4, or the drive of the servomotor 13, by the positional information based on the process origin ($O_w$). More specifically, the operation control part 21 and the servo controller 22 control the position of the process origin ($O_w$), seeing as a machine origin ($O_m$) (see FIG. 5). Moreover, the cutting program 20 describes the prescribed position that is abbreviated and the cutting means 4 is farthest away from the headstock 7 of the work support means 3 as a program origin ($O_p$). In this case, in the operation control part 21, the command of the cutting program 20 is converted to the feed command based on the process origin ($O_w$), or in the servo controller 22, the command which is output from the operation control part 21 is converted to the command based on the process origin ($O_w$). Herewith, the commercial cutting program 20 can be used without changing.

Moreover, only the control to the X-axis direction is explained in the above, but likewise, with regard to the control or the Z-axis direction as well as the one to the X-axis direction in the control unit 2, the movement control of the cutting means 4 by the positional information to the Z-axis direction based on the process origin ($O_w$), or the access direction control of the turret tool base 10 is also carried out. In this case, the reference position to the Z-axis direction of the process origin ($O_w$) is regarded as the work sit surface of the spindle chuck 8a.

Figure 5:
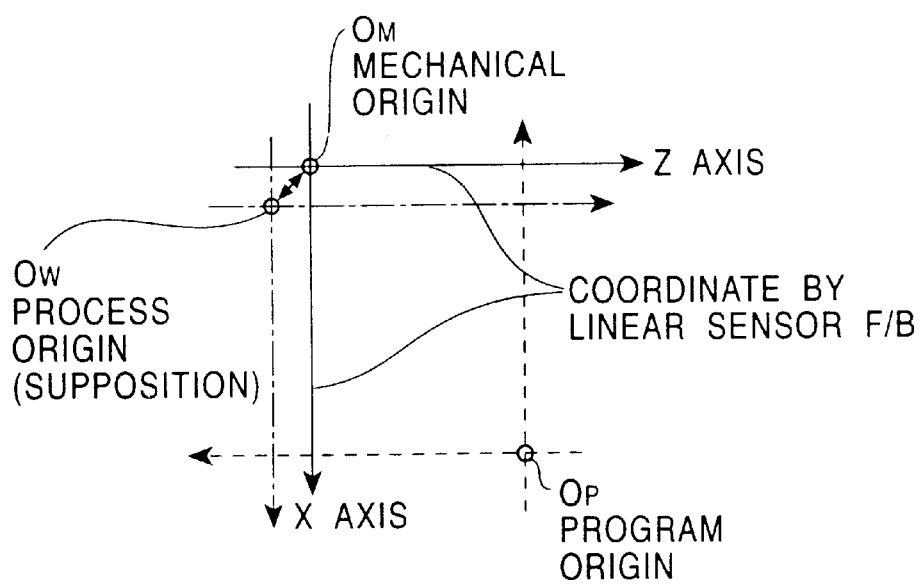
FIG. 5 is an illustrative diagram, showing the working of the same machine tool.

According to this structure, the control unit 2 controls the back and forth movement of the feed bar 9 and the access movement of the turret tool base 10 by the positional information of the feedback signal F/B based on the process origin ($O_w$) shown in FIG. 5. In other words, the movement control is carried out based on the process origin ($O_w$) seeing as the machine origin ($O_m$). The process origin ($O_w$) is the center of the spindle 8. The machine origin ($O_m$) is the origin coordinate of the feedback signal F/B of the position measurement means 25, and though there is a difference between the origin coordinates and the process origin ($O_w$) in fact, the difference is corresponded as the fixed complemented value.

As controlled by the positional information of the feedback signal F/B based on the process origin ($O_w$) like this, the process is hardly affected even if some deformation comes out to the machine itself by heat deformation or disturbance. In other words, the error that the positional information of the feedback signal F/B affects the process accuracy becomes only the machine deformation part in the process measurement range from the process origin ($O_w$) to the processing part of the work (W) (correspond to the work radius). That is why the process accuracy does not deteriorate even if the accuracy of the machine itself changes to some extent.

Figure 3:
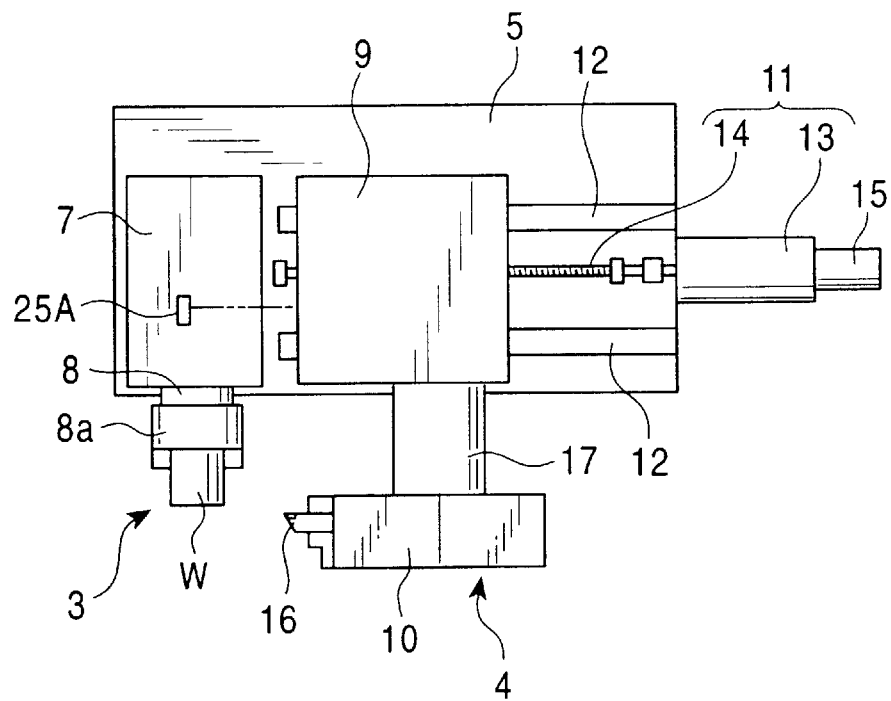
FIG. 3 is a top view of a variation of the machine part of the same machine tool.

Moreover, a linear sensor is used as the position measurement means 25 in the above-mentioned embodiment, but the position measurement means 25A composing the laser-measuring machine can be used as shown in FIG. 3, for example. The position measurement means 25a comprising this laser measuring machine measures the position of the feed bar 9, for example by that the spindle center in the headstock 7 is regarded as the beginning point. In case of using the laser-measuring machine, as in the aforementioned embodiment, the detecting value of the rotary detector 15 of the servomotor 13 can be used by switching, or only the detecting value of the laser-measuring machine can be used.

Figure 6:
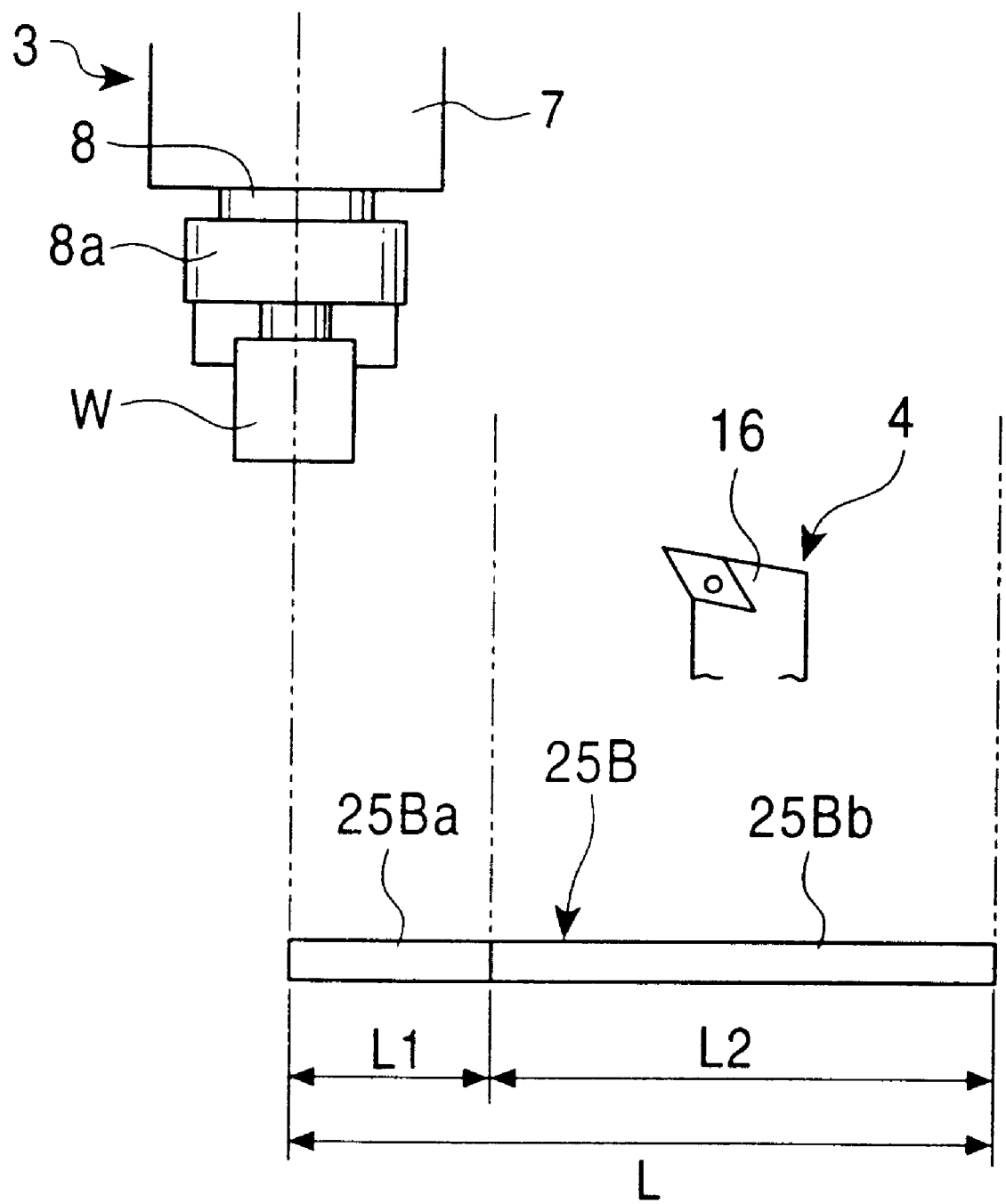
FIG. 6 is a partially enlarged top view in the other embodiment of the present invention.
Figure 7:
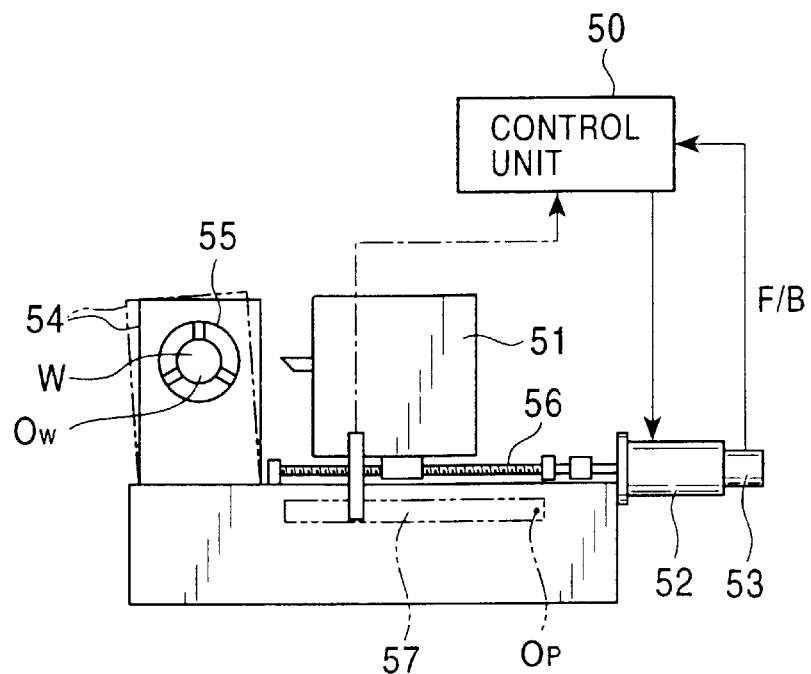
FIG. 7 is a front view according to a conventional machine tool.
Figure 8:
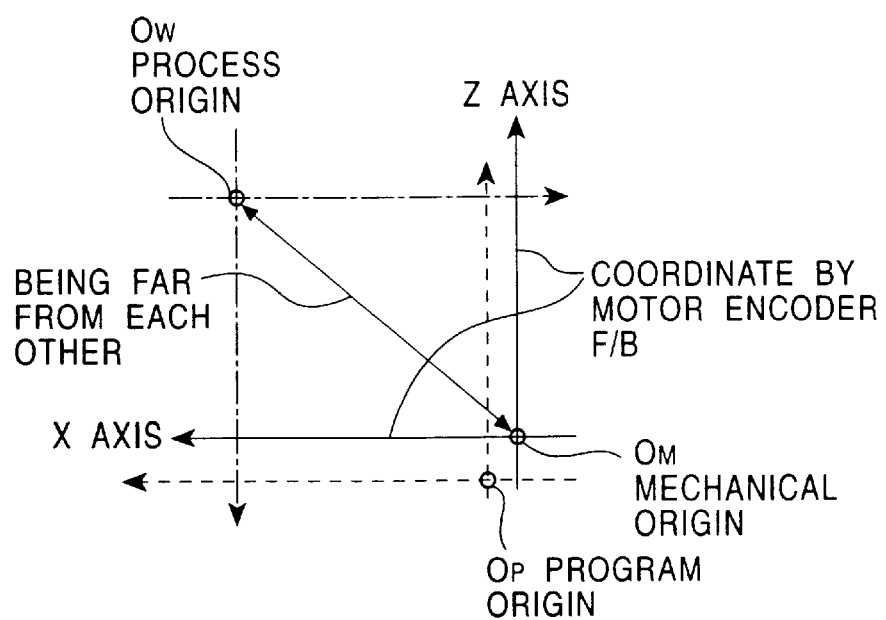
FIG. 8 is an explanation drawing of the operation of the conventional machine tool.

Moreover, in case of using the position measurement means 25B comprising a linear sensor as shown in FIG. 6, all-stroke L of the cutting means 4 is detected by the position measurement means 25B, and with regard to the position measurement means 25B, the accuracy of the part 25Ba of the moving range L1 that the cutting means processes can be finer than the one of the part 25Ba of the other moving range L2. By shortening the range, only the moving range to process like this, the cost can be reduced. The process accuracy is not affected even if the detecting accuracy is rough in the range from the moving range L1 to process to the other range L2.

Moreover, though the application to lathes is explained in the aforementioned embodiment, the present invention can also apply to machine tools that the cutting means 4 moves to the work support means 3, for example lathes and the like.

The machine tool of the present invention is equipped with the work support means which supports work, the movable cutting means to the work support means in order to process work and the control unit which controls the movement of the aforementioned cutting means by the positional information based on the process origin that is the prescribed position of the work support means, so that the high accuracy process can be carried out without deteriorating the process accuracy even if the accuracy of the machine itself changes to some extent.

In case that the position measurement means that the position to the movement direction of the aforementioned cutting means based on the aforementioned process origin is provided and the aforementioned positional information is obtained from this position measurement means, the control by the positional information based on the process origin by the above-mentioned control unit can be easily carried out.

In case that the aforementioned position measurement means measures only the moving range that the aforementioned cutting means processes, the cost of the position measurement means can be reduced without deteriorating the process accuracy.

What is claimed is:

1. A machine tool, comprising:
   a support work means to hold a workpiece;
   a headstock connected to the support work means;
   a cutting means movable to machine the workpiece;
   a scale connected to the headstock and slidably connected to the cutting means;
   a reading unit connected to the cutting means to read a positional information on the scale between the workpiece and the cutting means and a position of the cutting means; and
   a control unit connected to the cutting means and the reading unit to control the movement of the cutting means to machine the workpiece based upon the positional information read by the reading unit on the scale indicating a position of the workpiece and the position of the cutting means.

2. The machine tool recited in claim 1, wherein the scale is connected to a top of the headstock and the support work means is connected to a side of the headstock different from the top of the headstock.

3. The machine tool recited in claim 1, wherein the distance measured by the reading unit is relative to a process origin.

4. A machine tool, comprising:
   a support work means to hold a workpiece;
   a headstock connected to the support work means;
   a cutting means movable to machine the workpiece;
   a scale connected to the cutting means and slidably connected to the headstock;
   a reading unit connected to the headstock to read a positional information on the scale between the workpiece and the cutting means and.a position of the cutting means; and
   a control unit connected to the cutting means and the reading unit to control the movement of the cutting means to machine the workpiece based upon the positional information read by the reading unit on the scale indicating a position of the workpiece and the position of the cutting means.

* * * * *